United States Patent
Haepp et al.

(10) Patent No.: US 8,696,211 B2
(45) Date of Patent: Apr. 15, 2014

(54) CASSETTE SEAL AND WHEEL BEARING COMPRISING SAID CASSETTE SEAL

(75) Inventors: Alexander Haepp, Hofheim (DE); Robert Heuberger, Schweinfurt (DE); Marc-Andre Schaefer, Schweinfurt (DE); Wilhelm Walter, Poppenhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 549 days.

(21) Appl. No.: 12/810,603

(22) PCT Filed: Nov. 12, 2008

(86) PCT No.: PCT/DE2008/001864
§ 371 (c)(1),
(2), (4) Date: Nov. 12, 2010

(87) PCT Pub. No.: WO2009/067979
PCT Pub. Date: Jun. 4, 2009

(65) Prior Publication Data
US 2011/0044569 A1 Feb. 24, 2011

(30) Foreign Application Priority Data
Dec. 1, 2007 (DE) .......................... 10 2007 057 962

(51) Int. Cl.
*F16C 33/80* (2006.01)
*F16C 33/78* (2006.01)
*F01D 11/02* (2006.01)
*F16J 15/32* (2006.01)

(52) U.S. Cl.
USPC ............................ 384/480; 384/484; 277/351

(58) Field of Classification Search
USPC ......... 384/477, 480, 484, 486, 489, 544, 586, 384/589; 277/345, 351, 551, 626, 628
See application file for complete search history.

(56) References Cited

U.S. PATENT DOCUMENTS

| | | | |
|---|---|---|---|
| 2,639,954 A * | 5/1953 | Potter | 384/484 |
| 4,432,557 A * | 2/1984 | Drucktenhengst | 277/351 |
| 4,981,303 A | 1/1991 | Matsushima | |
| 4,991,982 A * | 2/1991 | Colanzi et al. | 384/486 |
| 5,209,499 A * | 5/1993 | Ruff et al. | 384/477 |

(Continued)

FOREIGN PATENT DOCUMENTS

| | | |
|---|---|---|
| DE | 29 26 207 Y | 1/1980 |
| DE | 101 52 586 Y | 12/2002 |

(Continued)

*Primary Examiner* — Marcus Charles
(74) *Attorney, Agent, or Firm* — Lucas & Mercanti, LLP (57) ABSTRACT

A compact cassette seal and a corresponding wheel hearing for a passenger car or truck. The cassette seal has a bent sheet-metal ring which is and/or can be non-rotatably connected to a radially inner component and an annular sealing system which is non-rotatably connected to a radially outer component. The sealing system has a bearing ring and a radially peripheral seal with at least one sealing lip. The seal is secured to the bearing ring and the sealing lips resting on the bent sheet-metal ring in a sealing manner. A radially outer ring end section of the sealing system defines a labyrinth seal with a bent sheet-metal section of the bent sheet-metal ring. The bent sheet-metal section radially overlaps the ring end section on the exterior thereby forming an axially aligned or substantially axially aligned labyrinth seal section of the labyrinth seal.

19 Claims, 9 Drawing Sheets

(56) References Cited

U.S. PATENT DOCUMENTS

| | | | |
|---|---|---|---|
| 5,419,642 A * | 5/1995 | McLarty | 384/486 |
| 5,722,664 A * | 3/1998 | Otto | 277/559 |
| 5,969,518 A * | 10/1999 | Merklein et al. | 384/448 |
| 6,003,871 A * | 12/1999 | Poll | 277/551 |
| 6,170,992 B1 * | 1/2001 | Angelo et al. | 384/477 |
| 6,217,225 B1 * | 4/2001 | Shimizu et al. | 384/589 |
| 6,302,404 B1 | 10/2001 | Bundgart | |
| 6,481,896 B1 * | 11/2002 | Ohtsuki et al. | 384/544 |
| 6,559,633 B1 * | 5/2003 | Nachtigal et al. | 384/448 |
| 2002/0064325 A1 | 5/2002 | Yeo | |
| 2004/0086212 A1 | 5/2004 | Ohtsuki et al. | |
| 2007/0222161 A1 | 9/2007 | Voydatch | |

FOREIGN PATENT DOCUMENTS

| | | | |
|---|---|---|---|
| EP | 1 666 777 | 6/2006 | |
| GB | 1 210 191 | 10/1970 | |
| JP | 11303878 A * | 11/1999 | F16C 33/76 |

* cited by examiner

CASSETTE SEAL AND WHEEL BEARING COMPRISING SAID CASSETTE SEAL

CROSS-REFERENCE TO RELATED APPLICATIONS

This application is a 371 of PCT/DE2008/001864 filed Nov. 12, 2008, which in turn claims the priority of DE 10 2007 057 962.6 filed Dec. 1, 2007, the priority of both applications is hereby claimed and both applications are incorporated by reference herein.

FIELD OF THE INVENTION

The invention relates to a cassette seal for sealing a wheel bearing for an automobile or for a truck, with an angle plate ring which is rotatably fixedly connected and/or connectible to a radially inner structural element, with an annular sealing arrangement which is rotatably fixedly connected and/or connectible without relative rotation to a radially outer structural element, wherein the sealing arrangement comprises a support ring and a radially circumferential seal with at least one sealing lip, wherein the seal is attached to the support ring and the sealing lip rests sealingly against the angle plate ring, and wherein a radially outwardly arranged ring end section of the sealing arrangement forms with an angle plate section of the angle plate ring a labyrinth seal, and a wheel bearing arrangement having the with cassette seal.

BACKGROUND OF THE INVENTION

Cassette seals of this type are used for sealing the wheel bearings in automobiles or trucks and for protecting the rolling bodies space of the wheel bearing against water, dirt and the like which enter from the outside. The cassette seals are usually constructed as two-part structural groups, wherein an angle plate ring, which forms a first structural component of the structural group, is pressed onto the inner ring of the wheel bearing, and a sealing arrangement which is pressed into a hub or the like, rotatably mounted via the wheel bearing, forms a second structural component of the structural group. In this connection, the angle plate ring and the sealing arrangement are constructed in such a way that they form an annular sealing device.

Such a cassette seal is known from printed publication DE 698 311 53 T2, which appears to form the closest prior art. The cassette seal disclosed therein has as an angle plate ring a wear sleeve element which sealingly interacts with a sealing arrangement constructed as a composite sealing element. In some embodiments of the cassette seal in this publication, the sealing element has a ring end section which forms, with a section of the wear sleeve element, a labyrinth seal. The free area of the labyrinth seal is realized at its outlet end as a circumferential, disk-shaped intermediate space, which is arranged parallel to a radial plane of an axis of rotation of the wheel bearing protected by the cassette seal.

SUMMARY OF THE INVENTION

The invention is based on the object of proposing a cassette seal in a compact structural form with good sealing properties as well as a corresponding wheel bearing arrangement for an automobile or truck.

Preferred or advantageous embodiments of the invention result from the dependent claims, the subsequent description and/or the enclosed Figures.

In accordance with the invention, a cassette seal for sealing a wheel bearing for an automobile or for a truck is disclosed, wherein the cassette seal is constructed so that it can be placed and/or pressed between a radially inner structural element, for example, a shaft, an axle journal or an inner ring of the wheel bearing, and a radially outer structural element, for example, a hub. The cassette seal is preferably constructed as a structural unit, wherein the components of the cassette seal are captively connected and/or hooked together.

The cassette seal includes an angle plate ring which is arranged radially circumferentially about an axis of symmetry or an axis of rotation of the wheel bearing and which has in the cross-section parallel to or through the axis of rotation an angled configuration. The angle plate ring is rotatably fixedly connected to the radially inner structural element or can be connected thereto. In particular, it is preferred that the radially inner structural element is constructed so as to be, during operation, a structural element which is stationary relative to the vehicle, in relation to which the radially outer structural element is mounted so as to be rotatable via the wheel bearing.

The cassette seal comprises a likewise annular sealing arrangement, wherein the sealing arrangement is rotatably fixedly connected to the radially outer structural element which is movably mounted. Consequently, the cassette seal is constructed in such a way that the sealing arrangement during operation is rotatable relative to the angle plate ring. The sealing arrangement includes a support ring, particularly a sheet metal support ring, and a radially circumferential seal with at least one sealing lip, wherein the seal is fastened to the support ring, for example, is vulcanized onto the support ring. The one or more sealing lips are preferably axially aligned and/or radially aligned sealing lips which at least partially sealingly rest against the angle plate ring. The sealing lips define a sealing direction, wherein the sealing direction is aligned in such a way that an entry of contamination through the cassette seal to the wheel bearing is avoided.

The sealing arrangement has a radially outer ring end section which, with an angle plate section of the angle plate ring, forms a labyrinth seal. In the labyrinth seal, ring end section and angle plate section are positioned and/or constructed relative to each other in such a way that a sealing gap is created which is narrow in cross-section and which optionally is angled several times or is constructed with curves and which, due to the high flow resistance in the sealing gap, prevents penetration of contamination through the labyrinth seal in a sealing space located between the angle plate ring and the sealing arrangement and, thus, prevents penetration to the wheel bearing.

In accordance with the invention, it is proposed that the angle plate section radially outwardly engages over the annular end section, so that an axially aligned or an essentially axially aligned labyrinth sealing section of the labyrinth seal is formed.

As a result of this further development, an annular and/or conical gap is created whose entry opening is constructed so as to be protected against contamination. Consequently, the penetration of contamination is significantly better prevented than would be the case in a labyrinth sealing section whose end section is constructed so as to be disk gap shaped and a radially outwardly open labyrinth sealing section. In addition, structural space is saved by folding the labyrinth seal, so that further components, such as, for example, an anti locking disk, can be arranged in a compact manner on a wheel bearing arrangement with the cassette seal.

In a preferred structural realization, the radially outer structural element is constructed as a hub onto which a wheel and/or a braking disk is placed, and the radially inner structural element is implemented as an inner ring of the wheel bearing.

In accordance with a first possible alternative embodiment of the invention, the ring end section of the sealing arrangement is aligned radially or essentially radially, preferably in such a way that a radially circumferential protective collar is formed. In this embodiment, the ring end section is engaged around or surrounded by the angle plate section preferably L-shaped or U-shaped from the radially outer side.

In accordance with another alternative embodiment of the invention, the ring end section is constructed axially or essentially axially, so that the latter resembles an axially aligned tubular piece or pipe end section. Also in this embodiment the annular end section can be engaged around or surrounded L-shaped or U-shaped by the angle plate section.

In both alternative embodiments mentioned above, it is moreover preferred that the angle plate section is aligned axially or essentially axially, particularly forms a pipe-shaped section, and interacts with an end face and/or a side surface of the ring end section, in order to form the axially or essentially axially aligned annular gap or conical gap shaped labyrinth seal section.

In accordance with a preferred structural development, the sealing gap of the labyrinth seal is continued by a combination of one and/or more circumferential annular gaps and/or disk gaps and/or conical gaps between the radially outer structural element and the ring end section in the mounted state. In particular, at the free end face of the angle plate section or end section, a disk-shaped gap is formed with the radially outer structural element. As an optional supplement, the sealing gap or disk gap of the labyrinth seal is continued by an annular gap which is arranged between the radially outer structural element and the angle plate section, and is aligned parallel to the labyrinth seal section.

In a possible further development of the invention, the sealing gap of the labyrinth seal is continued, angled once or several times starting from the labyrinth seal section, by a circumferential annular gap and/or disk gap and/or conical gap between the angle plate section and the sealing arrangement. This results in advantages because of a multiple angling of the sealing arrangement of the angle plate ring, however, this also increases the manufacturing costs, so that an evaluation between the length of the labyrinth seal or the sealing gap and the number of angles should take place.

The ring end section may be constructed as a part of the support ring and, thus, of metal; in another embodiment, the ring end section is constructed as a part of the seal and, thus, of synthetic material, for example, rubber or FKM. In particular, in the last mentioned embodiment, the angle plate section may have holding projections or similar devices which engage behind the ring end section as an assembly aid. During the first assembly of angle plate ring and sealing arrangement, the holding projections of the angle plate section are snapped open over the ring end section which is a part of the seal and, thus, is constructed elastically.

In a possible structural realization, the angle plate ring has a tubular portion which is constructed for a rotatably fixed fastening of the angle plate ring on the radially inner structural component. Preferably, the tubular portion of the angle plate ring is pressed onto the radially inner structural component.

At the free end of the tubular portion is arranged preferably a collar or flange as an assembly aid which engages around the sealing arrangement and holds the sealing arrangement, so that sealing arrangement and angle plate ring can be captively connected to each other, also in the non-mounted state.

In order to prevent a penetration of contamination, for example, water, especially spray water, splashing water or fog, between the tubular portion and the radially inner structural component in the direction of the wheel bearing, the tubular portion is sealed relative to the radially inner structural component by means of another sealing device, particularly a sealing lacquer layer, a rubber layer and/or an O-ring.

In an alternative embodiment, the radially inner structural element constructed as the inner ring is sealed relative to the angle plate ring, particularly relative to the tubular portion and simultaneously relative to an axle journal by way of a common O-ring. This embodiment employs the common O-ring in an unconventional manner for sealing three sealing partners, however, it has the advantage that an O-ring usually placed between inner ring and axle journal simultaneously is used for sealing the tubular portion. Thus, in this embodiment, the introduction of a groove as well as of an O-ring is dispensed with, which leads to a reduction of the manufacturing costs.

In a particularly preferred embodiment, the angle plate section and/or the ring end section have a circumferential truncated cone-shaped side surface section which, compared to a radial plane, which is arranged perpendicularly to the axis of rotation of the wheel bearing, is constructed inclined in its course radially outwardly in the direction of the wheel bearing. This embodiment reinforces the ejection of impurities which enter in the labyrinth area (especially of liquids) such as, for example, water.

In accordance with another advantageous embodiment, the ring end section has radially aligned wings which can be constructed, for example, as synthetic material wings placed on the ring end section and/or as embossed or formed grooves or webs. These supplements reinforce also the ejection of impurities from the labyrinth area.

A further object of the invention relates to a wheel bearing arrangement for an automobile or a truck having an axle journal, a hub and a wheel bearing, wherein the wheel bearing is formed or arranged for the rotatable support of the hub on the axel journal, wherein the wheel bearing arrangement has a cassette seal, as was just described or according to one the preceding claims, which is arranged for the sealing of the wheel bearing against contamination. The wheel bearing is preferably formed as a tow-row tapered roller bearing.

In accordance with a preferred further development of the invention, the wheel bearing arrangement includes an antilock disk which shows features, such as waves or holes, which are distributed in circumferential direction, which are constructed for interacting with an ABS sensor. The antilock disk is constructed so as to be inclined in the cross-section of the axis of rotation of the wheel bearing arrangement relative to the radial plane of the axis of rotation, wherein, in a preferred embodiment, the sealing arrangement as well as the angle plate ring are, at least over sections thereof, arranged in an area which is, for example, triangular in the cross-section, and which is formed by the antilock disk and the radially outer structural element. This embodiment provides a very compact integration of the antilock disk and of the labyrinth seal in the wheel bearing arrangement.

In addition to the compact structural configuration of the wheel bearing arrangement it is expected that because of the advantageous configuration of the labyrinth seal, the service life of the wheel bearing in the wheel bearing arrangement relative to conventional wheel bearing arrangement can be almost doubled.

BRIEF DESCRIPTION OF THE DRAWING

Additional features, advantages and effects of the invention result from the description of preferred embodiments of the invention and the enclosed Figures. In the drawing.

Parts which are corresponding to each other or are equal are in the Figures provided with the same reference numerals or, if they are obviously the same parts, are not entered for reasons of clarity.

DETAILED DESCRIPTION OF THE INVENTION

Figure 1:
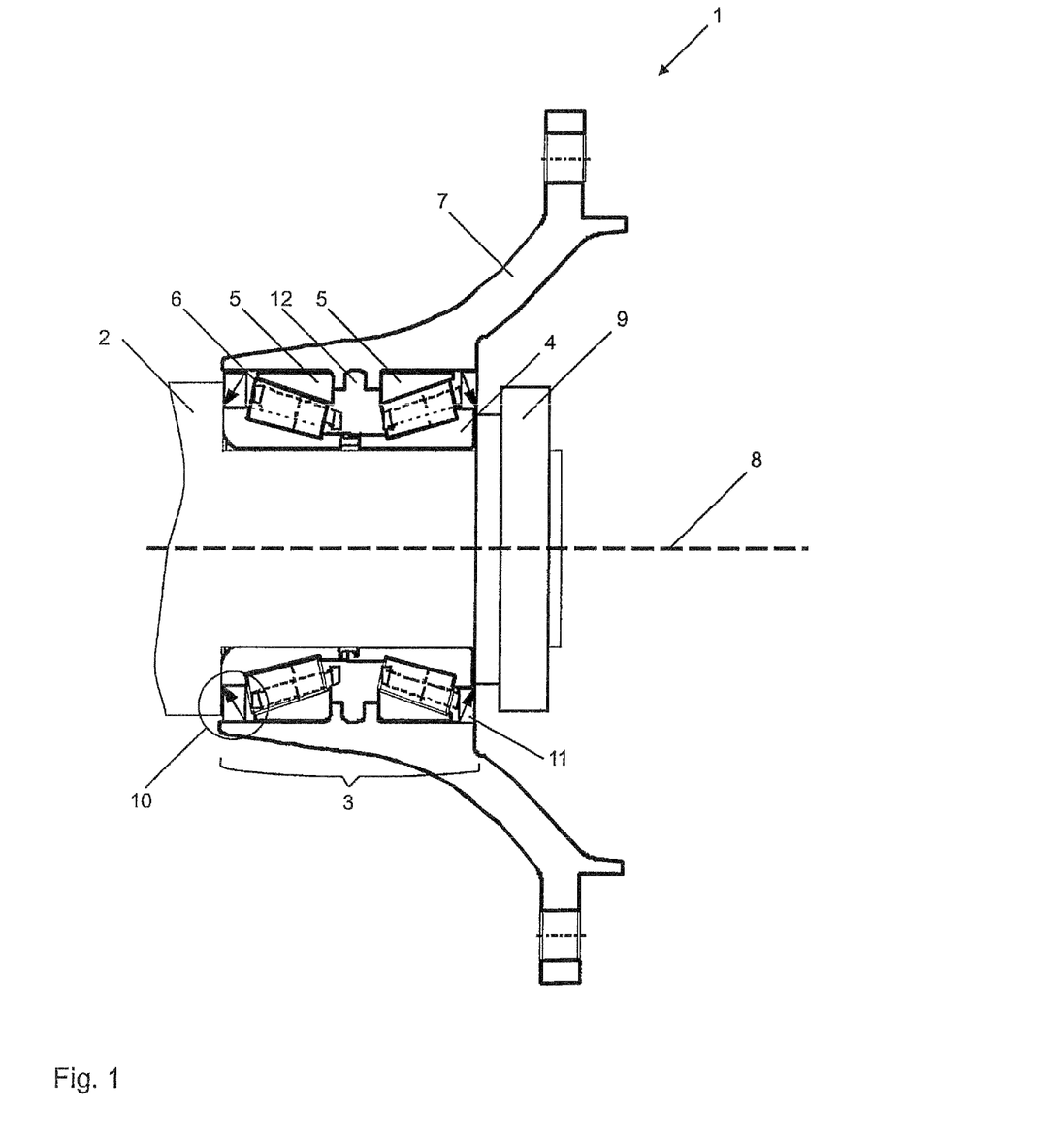
FIG. 1 is a schematic cross-sectional view of a wheel bearing for an automobile or for a truck in a schematic cross-sectional view.

FIG. 1 shows a schematic cross-sectional view of a wheel bearing arrangement 1 for an automobile or a truck. The wheel bearing arrangement 1 comprises an axle journal 2 on which is axially clamped a wheel bearing 3 constructed as a two-row tapered roller bearing. The roller bearing 3 shows two centrally contacting inner rings 4 as well as two outer rings 5, wherein between the inner rings 4 and the outer rings 5 a plurality of tapered rollers 6 is rotatably mounted. The outer rings 5 are pressed into a hub 7 constructed for receiving a wheel and optionally a braking disk, both not illustrated. Consequently, the hub 7 is rotatably supported about an axis of rotation 8 on the axle journal 2 via the wheel bearing 3. For fixing the inner ring 4 on the axle journal 2, the wheel bearing arrangement 1 includes a safety nut 9.

The sealing of the wheel bearing 3 relative to contamination entering from outside takes place on the side of the shaft through a cassette seal 10 and on the wheel side through another seal 11. Cassette seal 10 and additional seals 11 can optionally be constructed identical. The cassette seal 10 is constructed as a circumferential sealing ring which seals the hub 7 relative to the inner ring 4 and, thus, protects a wheel bearing space 12.

Figure 2:
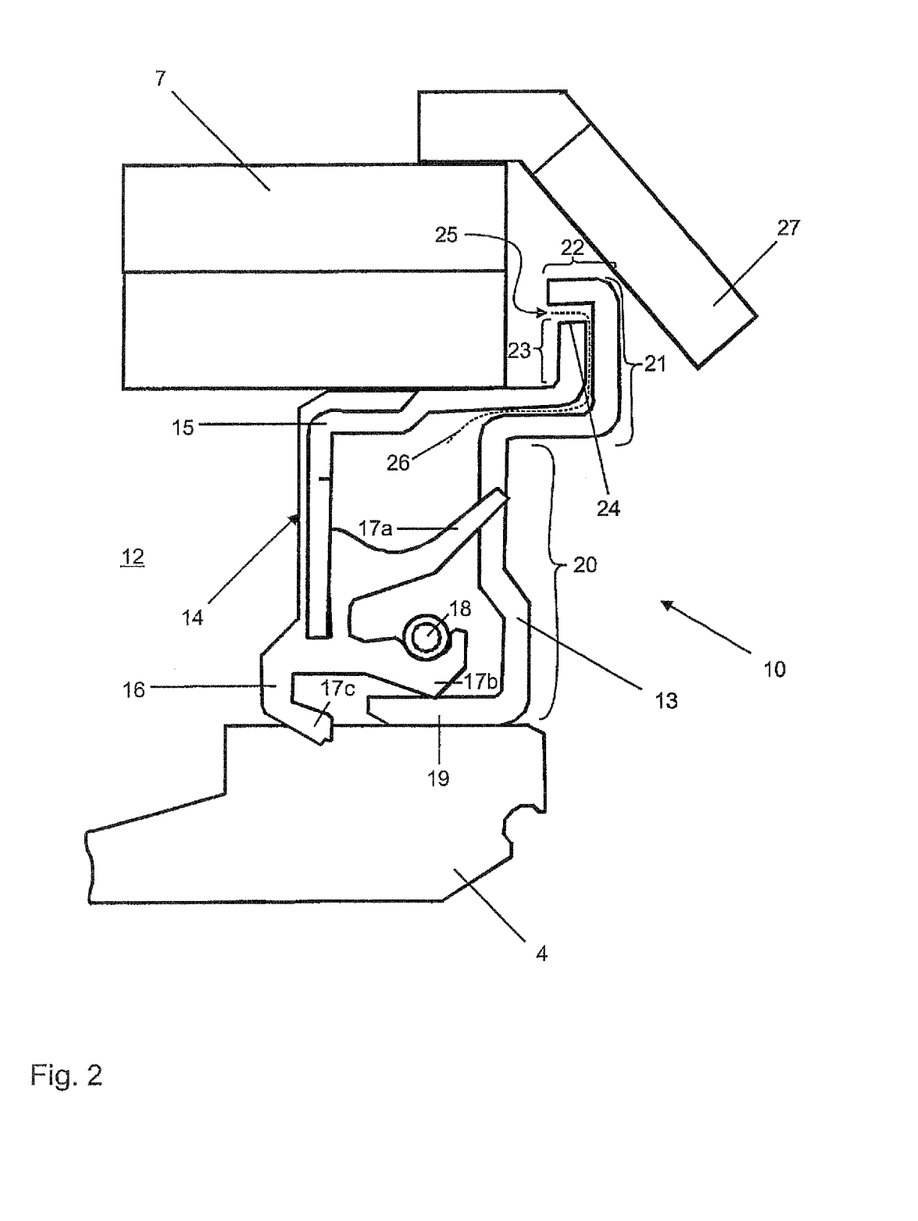
FIG. 2 is a schematic cross-sectional view of a cassette seal for the wheel bearing arrangement of FIG. 1 as a first embodiment of the invention.

FIG. 2 shows in a schematic cross-sectional view a first embodiment of the invention of the cassette seal 10 of FIG. 1.

Once again illustrated in the drawing are the inner ring 4 and a section of the hub 7 between which is pressed the cassette seal 10 in order to seal the wheel bearing space 12 relative to contamination.

The cassette seal 10 has an angle plate ring 13 which is arranged or pressed rotatably fixedly onto the inner ring 4, wherein the angle plate ring 13 together with a sealing arrangement 14 forms the cassette seal 10. The sealing arrangement 14 comprises a support ring 15 which is rotatably fixedly connected to or pressed into the hub 7, and onto which is arranged or vulcanized a seal 16. The seal 16 has three radially circumferential sealing lips 17a, b, and c, wherein the first sealing lip 17a is constructed as an axial sealing lip which is supported in the axial direction by the angle plate ring 13. The second sealing lip 17b, in contrast, is constructed as a radial sealing lip which rests sealingly in the radial direction against the angle plate ring 13. The third sealing lip 17c is also constructed as a radial sealing lip and is supported on the inner ring 4 or, in other embodiments, on the angle plate ring 13. For reinforcing the sealing effect, the second sealing lip 17b is reinforced by a circulating spring element 18.

The angle plate ring 13 has in the illustrated cross-section a contour which is angled several times and which is rotatably fixedly connected with the inner ring 4 via a tubular portion 19. Starting from the tubular portion 19, the angle plate ring 13 extends initially in a sealing area 20 which is perpendicularly aligned relative to the tubular portion 19; in the embodiment illustrated in FIG. 2, this tubular portion is angled twice. At the end of the sealing area 20, a labyrinth area 21 is adjoined, which initially extends in the axial direction and then is angled in the radial direction and, finally, after a further angle, continues in an angle plate section 22 extending in the axial direction of the wheel bearing 3 or the hub 7, wherein, in the embodiment illustrated in FIG. 2, the angle plate section is constructed as an end section.

The support ring 15 has in cross-section and, starting from an area which is adjacent to the tubular portion, initially a radial course, continues in an axially extending, twice angled section, the end section of which is once again constructed radial as the ring end section 23. The free end face 24 of the ring end section 23 forms together with the angle plate section 22 a circumferential annular gap 25 which forms a labyrinth seal section of a labyrinth seal 26 arranged between support ring 15 and angle plate ring 13.

Consequently, the labyrinth seal 26 has in the inlet area initially an annular gap shaped configuration, then a disk gap shaped and finally again an annular gap shaped configuration, before opening in the direction of an intermediate space between the angle plate ring 13 and the sealing arrangement 14. The inlet area of the labyrinth seal 16 opens into a radially outwardly open annular space which implements or also implements the functions of catching, conveying back, throttling and/or discarding of contamination.

Arranged as a supplement at the hub 7 is an antilock disk 27 which at least partially engages over the labyrinth area 21 of the angle plate ring 13. From the illustration it can be seen that the selected realization of the cassette seal 10 makes possible a very compact integration of the labyrinth seal 26 in the area under the anti locking disk 27.

Figure 3:
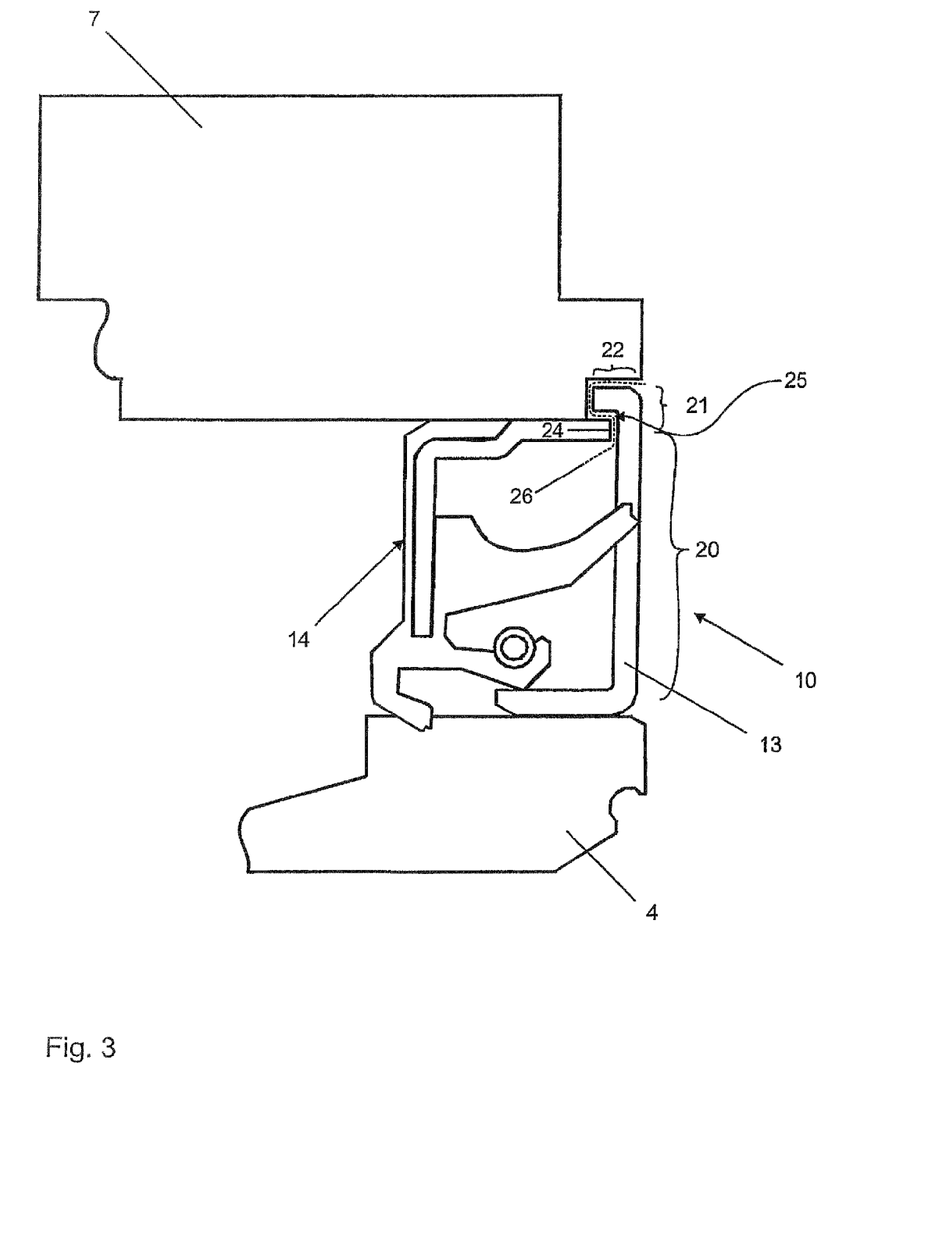
FIG. 3 is a schematic cross-sectional view of a cassette seal as a second embodiment of the invention.

FIG. 3 shows a second embodiment according to the invention of a cassette seal 10 for the wheel bearing 1 in the FIG. 1, wherein, in comparison to the embodiment of FIG. 2, the sealing area 20 of the angle plate ring 13 extends without an angle and the ring end section 24 of the support ring 15 extends in the axial direction as a tubular end section. The end of the sealing area 20 ends in the labyrinth area 21 which initially extends in the radial direction, subsequently is angled into the axial direction and is constructed as an end section in the direction toward the wheel bearing 3 or the hub 7 extending as an angled section 22. The labyrinth seal 26 again comprises an annular gap 25 which is open in the direction of the hub 7 and which is continued, on the one hand, in the direction of the intermediate space between the angle plate ring 13 and the sealing arrangement 14 by a disk gap between the free end face 24 of the ring end section 23 and a section of the sealing arrangement 20 or 21. In the opposite direction, the annular gap 25 is continued by a disk gap and subsequent annular gap through interaction of the angle section 22 with the hub 7.

Figure 4:
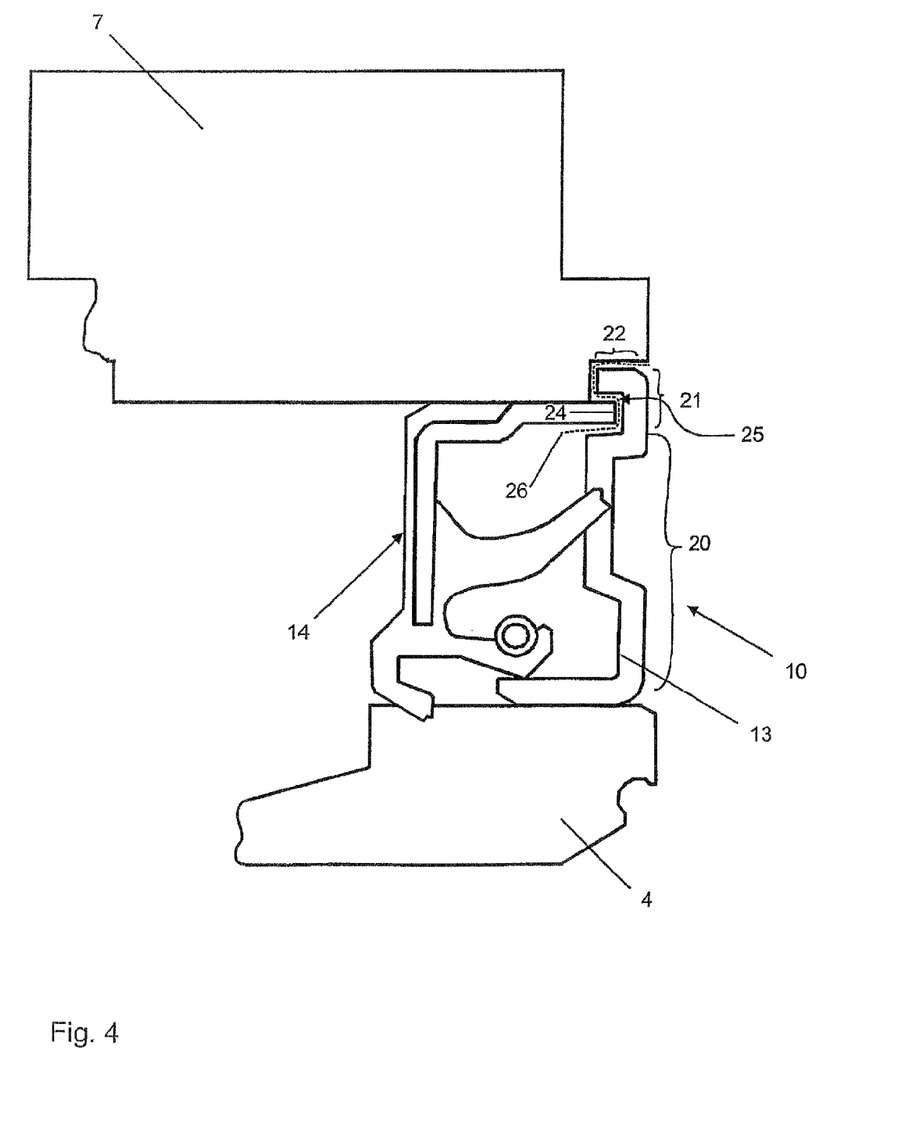
FIG. 4 is a schematic cross-sectional view of a cassette seal as a third embodiment of the invention.

FIG. 4 shows a third embodiment of an inventive cassette seal 10 which, in comparison to the embodiment in FIG. 3, has in the sealing area 20 of the angle plate ring 13 several angles, so that the ring end section 24 of the support ring 15 is engaged around in the form of a W and, in comparison to the FIG. 3, the labyrinth seal 26 is extended by an additional annular gap.

Figure 5:
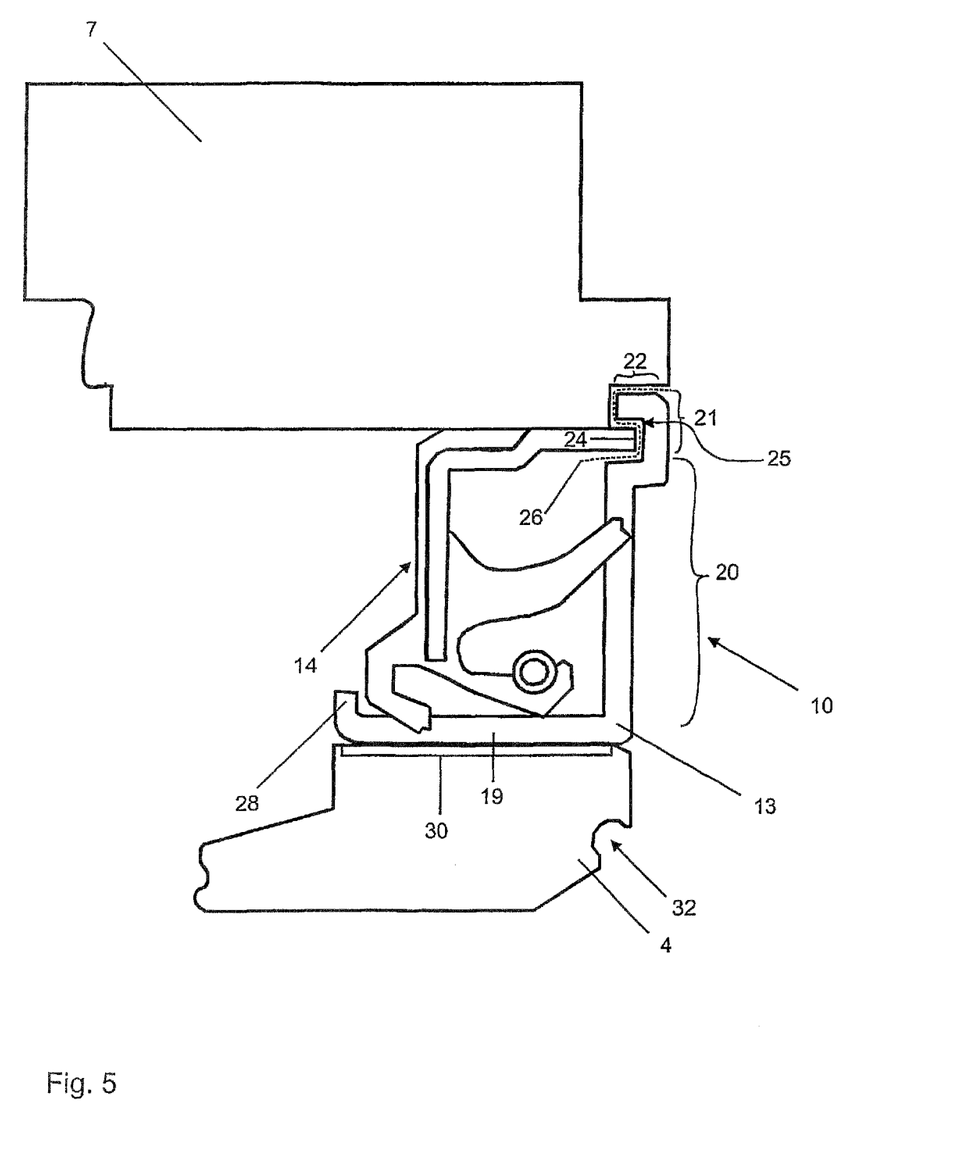
FIG. 5 is a schematic cross-sectional view of a cassette seal as a fourth embodiment of the invention.

FIG. 5 shows a fourth embodiment of the invention, wherein, in comparison to the third embodiment of the invention, the embodiment includes a tubular portion 19 extended into the direction of the wheel bearing, wherein the tubular portion 19 is deformed or beaded at its free end in the form of a circumferential collar 28, which collar 28 engages in the axial direction around the sealing arrangement 14 towards the wheel bearing. The collar 28 forms an assembly aid because, due to the collar 28, the angle plate ring 13 and the sealing arrangement 14 form a structural unit which is already captively connected prior to the mounting.

Figure 6A:
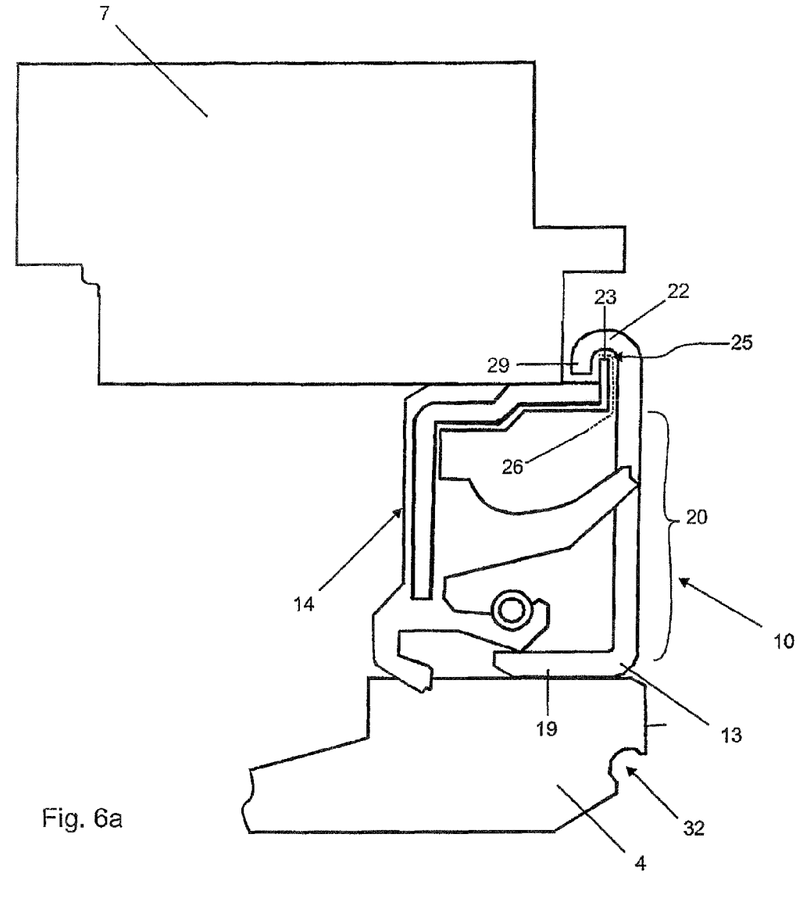
FIGS. 6a, b is a schematic cross-sectional view or an axial top view of a cassette seal as a fifth embodiment of the invention.
Figure 6B:
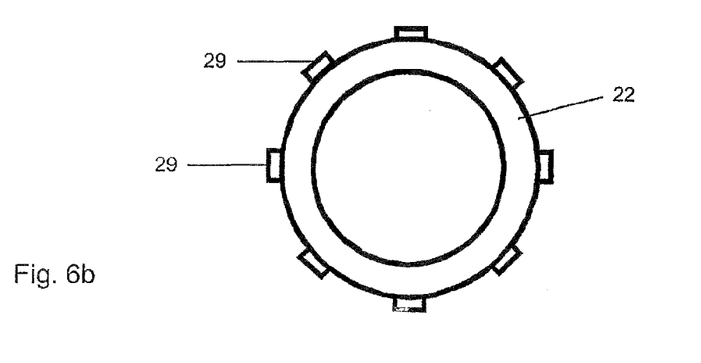

The FIGS. 6a and 6b show a fifth embodiment of the invention in a schematic cross-sectional illustration or a schematic axial top view, wherein the ring end section 23 of the sealing arrangement 14 is constructed as a circumferential sealing ring, particularly as a circumferential elastomer ring. In this embodiment, a labyrinth seal 26 is also realized, which includes an annular gap 26, which is formed by the ring end section 23 and the angular plate section 22 and which continues in a disk gap.

On the angle plate section 22, holding projections 29 are arranged uniformly distributed in the circumferential direction. When the angle plate ring 13 is mounted in the sealing arrangement 14 prior to the cassette seal 10 being mounted in the wheel bearing arrangement 1, the holding projections 29 are pushed over the circumferential sealing or elastomer ring 23 and are hooked behind the ring, so that a securing device is formed between the angle plate ring 13 and the sealing arrangement 14.

Figure 7:
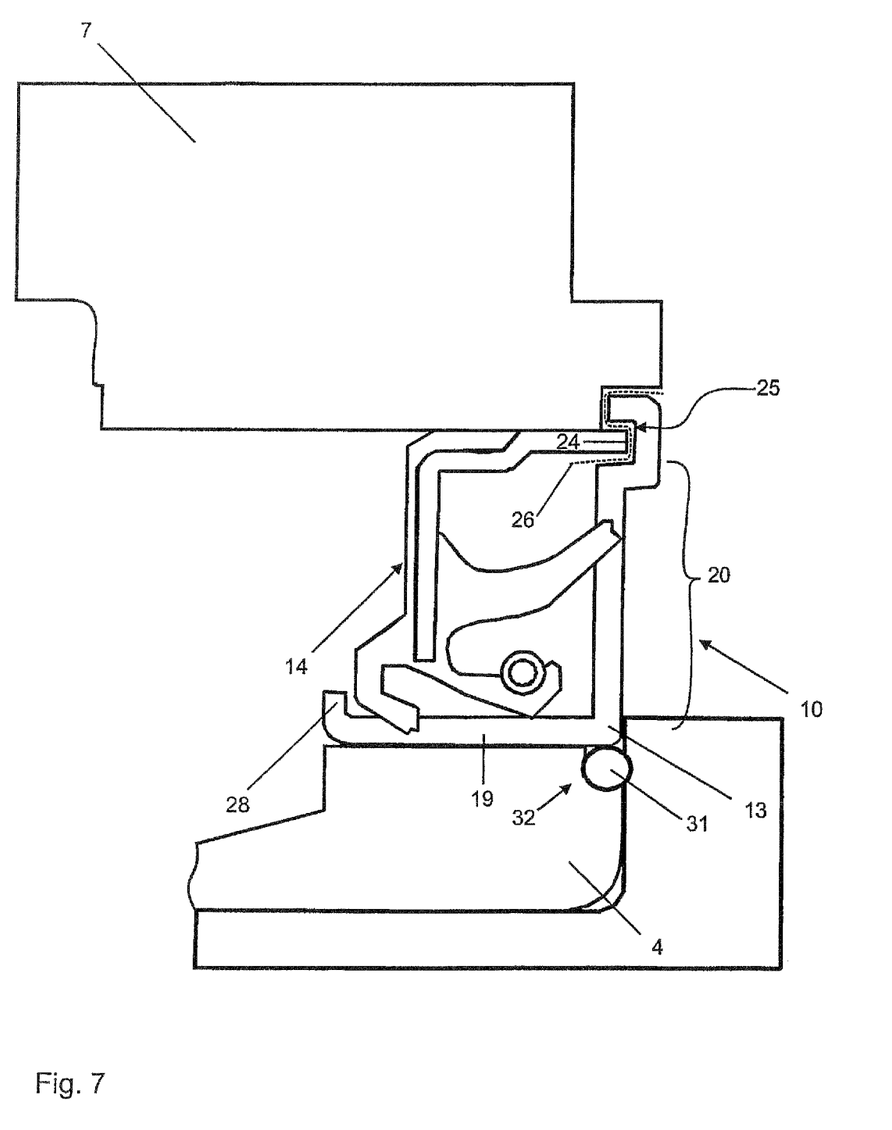
FIG. 7 is a schematic cross-sectional view of a cassette seal as a sixth embodiment of the invention.

FIG. 7 shows a sixth embodiment of the cassette seal 10 which is constructed in analogy to the fourth embodiment of FIG. 5, however, with the difference that the angle plate ring 13 in FIG. 5 is sealed, by way of a sealing lacquer layer or rubber layer 30 relative to the inner ring 4 in the direction of the wheel bearing, while in FIG. 7, an O-ring 31 is used, which simultaneously seals the inner ring 4 relative to the axle journal 2 and the angle plate ring 13 or the tubular portion 19. In comparison to the FIG. 5 it can be seen that in FIG. 5 is arranged a groove 32 for an O-ring radially further inwardly in order to seal the inner ring 4 relative to the axle journal 2. By offsetting the groove 32 or the O-ring 31 in the position illustrated in FIG. 7, the O-ring 31 can be used for a double function.

Figure 8:
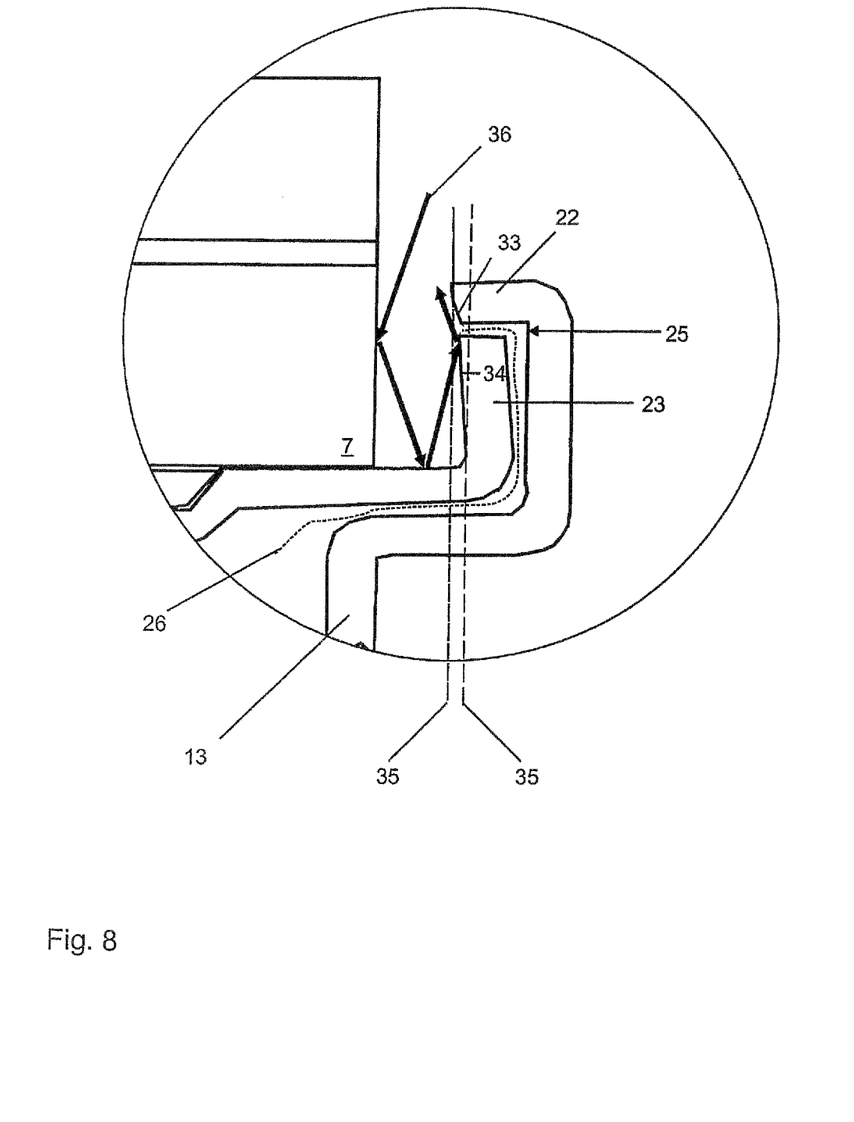
FIG. 8 is a detail of FIG. 2 with an optional supplement.

FIG. 8 shows a detail of the angle section 22 of FIG. 2, wherein, in comparison to FIG. 2, the angle section 22 as well as the ring end section 23 are deformed, for example, bent or embossed, in such a way that they have a side surface 33 or 34 facing in the direction of the hub 7 which are angled in cross-section relative to radial planes 35 which are arranged perpendicularly to the axis of rotation 8. This angled configuration ensures that liquid entering in the direction of arrows 36 is deflected at the side surfaces 33 or 34 in such a way that the liquid is lifted over the inlet of the annular gap 25 and less contamination can enter into the labyrinth seal 26 as a result.

Figure 9A:
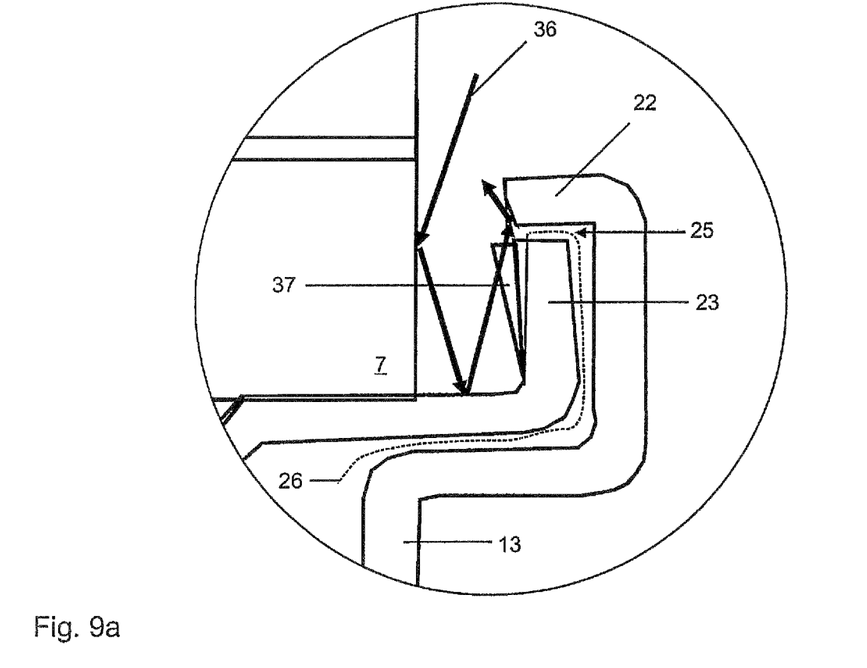
FIG. 9 is a detail of FIG. 8 with a further optional supplement.
Figure 9B:
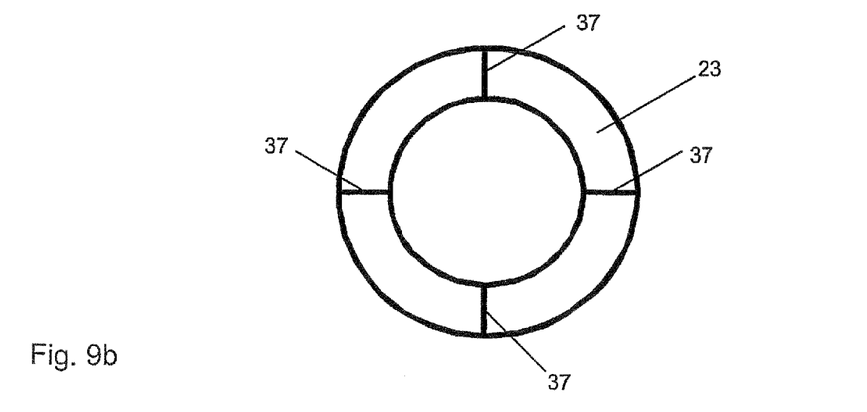

FIGS. 9a and 9b show an additional optional supplement wherein rubber lips 37, webs or grooves are arranged on the ring end section 23 in order to actively eject liquid which enters in the area of the labyrinth seal 26 in accordance with arrows 36. As can be seen in the illustration of FIG. 9b, which is a schematic axial top view of the rubber lip area, for example four rubber lips 37 are uniformly distributed in circumferential direction on the ring end section.

The various optional embodiments of cassette seals 10 in the Figures may also be occurring in other combinations. In particular, the measures for removing contamination in FIGS. 8 and 9 may be used in the other cassette seals 10, or the configuration of labyrinth seal 26 and tubular portion 19 may occur in other combinations.

LIST OF REFERENCE NUMERALS

1 Wheel bearing arrangement
2 Axle journal
3 Wheel bearing
4 Inner ring
5 Two-piece outer ring
6 Tapered rollers
7 Hub
8 Axis of rotation
9 Locking nut
10 Cassette seal
11 Seal
12 Wheel bearing space
13 Angle plate ring
14 Sealing arrangement
15 Support ring
16 Seal
17a Sealing lip
17b Sealing lip
17c Sealing lip
18 Spring element
19 Tubular portion
20 Sealing area
21 Labyrinth area
22 Angle plate section
23 Ring end section
24 Free front end
25 Annular gap
26 Sealing gap/labyrinth seal
27 ABS disk
28 Collar
29 Holding projections
30 Rubber layer
31 O-ring
32 Groove
33 Side surface
34 Side surface
35 Radial planes
36 Arrows
37 Rubber lips

The invention claimed is:
1. A cassette seal for sealing a wheel bearing for an automobile or a truck, comprising:
an angle plate ring which is rotatably fixedly connected and/or connectible to a radially inward structural element; and
a ring-shaped sealing arrangement which is rotatably fixedly connected and/or connectible to a radially outer structural element,
wherein the sealing arrangement comprises a support ring and a radially circumferential seal with at least one sealing lip,
wherein the seal is fastened to the support ring and the sealing lip sealingly rests against the angle plate ring,
wherein a radially outwardly arranged ring end section of the sealing arrangement forms with an angle plate section of the angle plate ring a labyrinth seal, and wherein the angle plate section engages over the ring end section radially outwardly, so that an axially aligned or essentially axially aligned labyrinth seal section of the labyrinth seal is formed.

2. The cassette seal of claim 1, wherein the radially outer structural element is a hub and/or the radially inner structural element is an inner ring of the wheel bearing.

3. The cassette seal of claim 1, wherein the ring end section extends radially.

4. The cassette seal of claim 1, wherein the ring end section is aligned so as to be axially extending.

5. The cassette seal of claim 1, wherein the angle plate section extends axially.

6. The cassette seal of claim 1, wherein the sealing gap of the labyrinth seal, starting from the labyrinth sealing section, is angled once or several times and continues through a circumferential annular gap and/or disk gap between the radially outer structural elements and the angle steel section.

7. The cassette seal of claim 1, wherein a sealing gap of the labyrinth seal, is continued, angled once or several times starting from the labyrinth seal section, by an annular gap and/or a disk gap between the angle plate section and the sealing arrangement.

8. The cassette seal of claim 1, wherein the ring end section is part of a support ring or part of the seal.

9. The cassette seal of claim 1, wherein the angle plate section has holding projections which engage behind the ring end section as an assembly aid.

10. The cassette seal of claim 1, wherein the angle plate ring includes a tubular portion which is constructed and/or arranged for the rotatably fixed fastening of the angle plate ring to the radially inner structural component.

11. The cassette seal of claim 10, wherein the tubular portion has at a free end a collar as an assembly aid.

12. The cassette seal of claim 10, wherein the tubular portion is sealed relative to the radially inner structural component by means of a sealing device.

13. The cassette seal of claim 12, wherein the radially inner component, which is formed as an inner ring, is sealed relative to the angle plate ring and relative to an axle journal by a common O-ring.

14. The cassette seal of claim 12, wherein the sealing device is a sealing lacquer, a rubber seal and/or an O-ring.

15. The cassette seal of claim 12, wherein the inner ring is sealed relative to an axle journal by a common O-ring.

16. The cassette seal of claim 1, wherein the angle plate section and/or the ring end section have a circumferential truncated cone-shaped side surface section.

17. The cassette seal of claim 1, wherein the ring end section has radially directed wings.

18. A wheel bearing arrangement for an automobile or a truck, comprising:
    an axle journal;
    a hub;
    a wheel bearing, and
    a cassette seal according to claim 1,
    wherein the wheel bearing is constructed and/or arranged for a rotatable support of the hub on the axle journal, and
    wherein the cassette seal is arranged for sealing the wheel bearing.

19. The wheel bearing arrangement of claim 18, further comprising: an ABS disk which is arranged in a cross-section alongside an axis of rotation of the wheel bearing at an angle relative to a radial plane of the axis of rotation, and, together with the hub forms a structural space which is engaged around and in which the angle plate section and/or the ring end section are arranged in a protected manner.

* * * * *